I. FOCHT.
MILK STRAINER CLOTH FASTENER.
APPLICATION FILED AUG. 19, 1908.

911,583.

Patented Feb. 9, 1909.

Irvine Focht, Inventor

Witnesses:
Anne Mitchell.
Josephine Mitchell.

By Geo. D. Mitchell, Attorney

UNITED STATES PATENT OFFICE.

IRVINE FOCHT, OF WELLSBORO, PENNSYLVANIA.

MILK-STRAINER-CLOTH FASTENER.

No. 911,583.  Specification of Letters Patent.  Patented Feb. 9, 1909.

Application filed August 19, 1908. Serial No. 449,262.

*To all whom it may concern:*

Be it known that I, IRVINE FOCHT, a citizen of the United States, residing at Wellsboro, in the county of Tioga and State of Pennsylvania, have invented certain new and useful Improvements in Milk-Strainer-Cloth Fasteners, of which the following is a specification.

My invention relates to new and useful improvements in means for fastening milk strainer-cloths to the rims of aerators, and milk coolers, and it has for its special object to provide an attachment which while cheap and simple is readily applied and detached and is durable and sanitary.

In the handling of milk in the modern dairy it is found desirable to strain, aerate and cool the milk as promptly as possible after it is taken from the cow, as the warm milk, more or less impregnated with bacteria and other foreign matter, is then in a peculiarly susceptible condition for setting up fermentation. Recent tests have shown in fact that the bacteria at this stage may double in number by geometrical progression every half hour. Thus the treatment the milk receives at this critical juncture determines to a large extent its keeping qualities, and carelessness or delay will result in serious deterioration.

A usual practice is to tie a piece of cheesecloth over the top of the pail or other receptacle with a string or fasten it with a number of clothespins or the like. Either method requires considerable time and patience for the adjustment of the cloth, and the clothespins especially are apt to become dirty and taint the milk. I have designed my fastener to obviate these difficulties and its construction and operation will be readily understood from the accompanying drawings, wherein—

Figure 1:
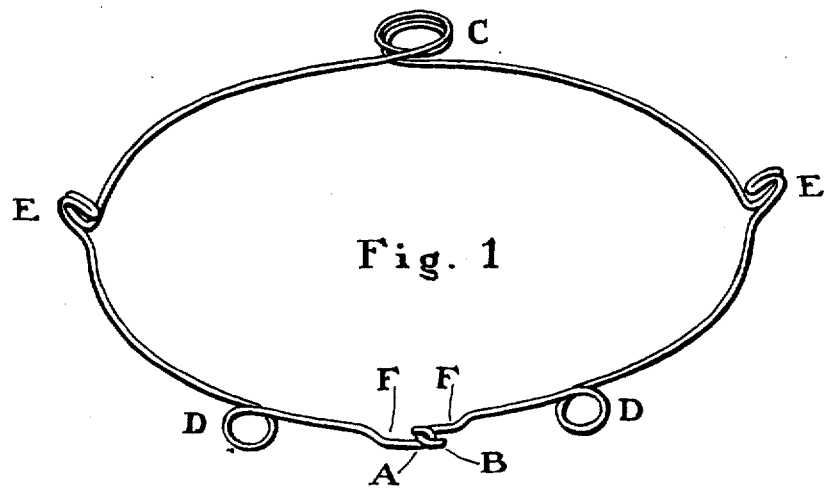
Figure 2:
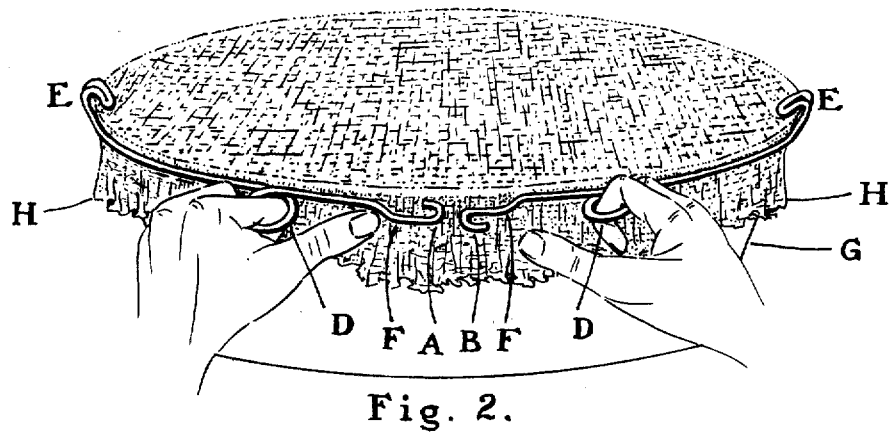

Figure 1 represents my fastener before being applied, and Fig. 2 illustrates how it is adjusted in place to hold the strainer-cloth over the top of the aerator, or milk cooler.

The same letters refer to the same parts where they occur in both views.

My fastener is made of spring wire, bent in the form shown particularly in Fig. 1 and nickel plated so as not to rust. The free ends are formed into the hooks A, B, which are interlocked when the fastener is applied. At C is a double spiral and at D, D single spirals, which allow of a certain amount of give in the fastener, thus permitting it to take up limited inequalities in size of receptacle and thickness of cloth. The spirals D, D also serve as handles in attaching the fastener, as will be explained.

At E, E the wire is bent upon itself as shown to form hooks designed to grasp the top rim of the receptacle and keep the fastener from slipping down out of place and letting the cloth loose.

At F, F the wire is bent so as to form an offset; this is an important provision, I find, as it gives room for any excess fullness in the cloth to be gathered at this point.

In Fig. 2, H, H represent the folds of the strainer-cloth and G represents the aerator or milk cooler to which the fastener is applied.

My device being constructed as described, its mode of operation is as follows: When it is desired to strain milk into an aerator, or milk cooler, a piece of cheesecloth is spread over the top of the receptacle, its edges, as H, H, being allowed to fall down over the rim. The fastener is then grasped in both hands, the forefingers being placed in the spirals D, D, and is brought round the top of the receptacle just under the rim and inclosing the cheesecloth and is joined together by the hooks A, B, the thumbs being thus in a convenient position to keep the cloth taut and arrange any excess folds of it within the extra space provided by the offsets at F, F. It takes but a moment to apply the fastener and it holds the strainer-cloth so securely that there is no danger of its coming off, as so often happens with makeshift devices.

I could of course dispense with one or two of the spirals C, D, D, or simply leave a small outward crimp in the wire at these points, and my invention would still be operative. Nor are the offsets F, F absolutely essential to its working. Furthermore I might substitute for the hooks E, E small spurs or the like to catch in the cloth and keep the fastener in place, but these would be mere equivalents, and I prefer the form of construction shown.

Having thus described my invention, what I claim and desire to secure by Letters Patent is:

1. A fastener for removably holding a piece of cheesecloth or other strainer material over the top of a receptacle, consisting of a wire bent in a form adapted to embrace the top of the receptacle and the superimposed strainer-cloth, and provided with terminal means for joining the ends together, one or more spiral turns or crimps to furnish limited elasticity, and means for keeping the fastener from falling down out of place.

2. A fastener for removably holding a piece of cheesecloth or other strainer material over the top of a receptacle, consisting of a wire bent in a form adapted to embrace the top of the receptacle and the superimposed strainer-cloth, being provided at A, B, its free ends, with mutually engaging hooks, at F, F with outward offsets adapted to give room for excess folds of the cloth, at D, D and C with spiral turns for furnishing limited elasticity to the fastener and to serve as handles in adjusting the fastener in place, and at E, E with hooks adapted to grasp the top rim of the receptacle and hold the fastener in place, substantially as shown and described.

In testimony whereof I affix my signature in presence of two witnesses.

IRVINE FOCHT.

Witnesses:
HARRY N. SHERWOOD,
E. H. WERUL.